(12) United States Patent
Greenley et al.

(10) Patent No.: US 10,569,298 B2
(45) Date of Patent: Feb. 25, 2020

(54) SUBSTRATE WITH EPOXY CURED BY ULTRAVIOLET LASER

(71) Applicant: Intel Corporation, Santa Clara, CA (US)

(72) Inventors: Michael Greenley, Chandler, AZ (US); Elah Bozorg-Grayeli, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 15/717,582

(22) Filed: Sep. 27, 2017

(65) Prior Publication Data

US 2019/0091722 A1    Mar. 28, 2019

(51) Int. Cl.

| | | |
|---|---|---|
| *B05D 3/06* | (2006.01) | |
| *C09J 163/00* | (2006.01) | |
| *C09J 5/04* | (2006.01) | |
| *G02B 7/02* | (2006.01) | |
| *C09D 163/00* | (2006.01) | |
| *C08G 59/18* | (2006.01) | |

(52) U.S. Cl.
CPC ............. *B05D 3/067* (2013.01); *C08G 59/18* (2013.01); *C09D 163/00* (2013.01); *C09J 5/04* (2013.01); *C09J 163/00* (2013.01); *G02B 7/025* (2013.01); *G02B 7/028* (2013.01); *C09J 2205/31* (2013.01); *C09J 2463/00* (2013.01)

(58) Field of Classification Search
CPC .......... G02B 7/025; G02B 7/028; G02B 6/32; G02B 6/36; G02B 6/4204; G02B 6/4214; G02B 6/4239; G02B 6/4244; G02B 6/4246; B05D 3/067; C09J 163/00; C09J 2205/31; C09J 2463/00; G03F 7/00; G03F 7/0005; G03F 7/20; G03F 7/2002; G03F 7/2004; G03F 7/20067; G03F 7/70425; G03F 7/70433; G03F 7/70441; G03F 7/2022; B01D 61/147; B01D 67/0034; B01D 67/0088; B01D 2325/08; B01D 2323/34; B29C 65/16; B29C 65/1606; B29C 65/1654; B29C 65/1658; B29C 65/1661; B29C 65/4845
See application file for complete search history.

(56) References Cited

U.S. PATENT DOCUMENTS

| | | | | |
|---|---|---|---|---|
| 4,844,947 | A * | 7/1989 | Kasner | B05D 5/06 427/510 |
| 5,615,052 | A * | 3/1997 | Doggett | G01N 21/274 359/642 |
| 2012/0255863 | A1* | 10/2012 | Joye | C25D 1/003 205/70 |
| 2013/0101796 | A1* | 4/2013 | Arzt | B82Y 10/00 428/156 |
| 2013/0108961 | A1* | 5/2013 | Oonishi | C08G 59/687 430/280.1 |
| 2013/0153428 | A1* | 6/2013 | Akana | C25D 11/20 205/50 |

OTHER PUBLICATIONS

Liu, Z.; Xu, W.; Hou, Z.; Wu, Z. A Rapid Prototyping Technique for Microfluidics with High Robustness and Flexibility. Micromachines, 7, 201, published Nov. 6, 2016. (Year: 2016).*

* cited by examiner

*Primary Examiner* — Christopher M Rodd
(74) *Attorney, Agent, or Firm* — Schwabe, Williamson & Wyatt, P.C.

(57) ABSTRACT

Embodiments herein relate to curing of an epoxy using an ultraviolet (UV) laser. A volume of epoxy may be coupled to an area of a surface, and the volume of epoxy is cured and surrounded by material other than cured epoxy, where the area of the surface is substantially equal to a diameter of the UV laser beam used to cure the epoxy. Other embodiments may be described and/or claimed.

22 Claims, 7 Drawing Sheets

SUBSTRATE WITH EPOXY CURED BY ULTRAVIOLET LASER

FIELD

Embodiments of the present disclosure generally relate to the field of package assemblies, and in particular to assembly components coupled using ultraviolet (UV)-cured epoxy.

BACKGROUND

Legacy implementations for adhering two components together includes placing an epoxy between the two components and using a traditional lamp such as a mercury lamp, or a UV light-emitting diode (LED) lamp to cure the epoxy. Depending upon the epoxy used, this process may take 15 seconds to up to 60 seconds or even longer for the epoxy to fully cure. Furthermore, a subsequent thermal cure is required and usually takes one or more hours at an elevated temperature before the two components are adhered together. Example epoxies may include two-party epoxies and thermally cured epoxies.

DETAILED DESCRIPTION

Embodiments of the present disclosure generally relate to using UV lasers to cure photosensitive and/or UV-initiated cationic epoxy resins. By using a UV laser source, a cure location may be finely controlled and different cure behaviors created for one or more epoxies. As a result, a faster and a more customizable cure behavior may be obtained for connecting components within and assembly. By varying the power of the UV laser and other laser parameters, the structure of the resulting cured epoxy features may be varied to meet various manufacturing requirements in a shorter amount of time in comparison to legacy processes.

In one example, for a silicon photonics assembly, optical components may be integrated into a final product assembly alongside a silicon die where mechanical tolerances and the tolerances of the optical path within the assembly must be considered. One of the goals of the assembly process is to minimize the shifting of components during an epoxy cure process relative to the component's ideal optical location to minimize signal loss. In legacy processes, a contributing factor to optical path misalignment is the shifting of components due to adhesive shrinkage during the legacy epoxy cure process. This shrinkage can shift components due to non-uniform dispensing and/or shifting between the initial optical cure and final thermal curing process. Minimizing this interface shrinkage can improve process margin for existing designs and additionally enable new design options due to an expanded manufacturing envelope. Optical losses are energy losses, so one of the key developments that tighter tolerances on optical pathways enable is lower power designs in addition to improving yield on existing designs. Lower power designs improve thermal performance and/or enable additional active features to be included in the design.

A UV laser may cure an epoxy at an interface, such as a substrate, where the interface is transparent to the UV wavelength. The UV laser beam may then pass through the transparent substrate and interact with an initiator in the epoxy resin to cause the epoxy to cure. The legacy thermal cure process introduces a sit time where the epoxy is uncured and therefore is able to allow interfaces and components to shift. Embodiments of this disclosure greatly reduce the possibility of this shifting by fully curing an arbitrary pattern of adhesive.

Related to this, a characteristic of the epoxy cure process is that as temperature increases, epoxy viscosity decreases until a point when the cure cross-linking dominates the thermal reduction in viscosity and the epoxy cures to its final state. Embodiments in this disclosure have the benefit relative to legacy processes that it diminishes the time spent in the low-viscosity 'trough' because the spot cure process transitions the epoxy from its uncured state to its fully cured state far more rapidly than in legacy processes, for example in less than 1 second. Embodiments disclosed herein may be referred to as "spot cures."

In embodiments, a spot-cure process may enable the creation of tight-pitch epoxy resin features to combine two or more components (e.g. substrates or other materials) to create a desired mechanical and/or thermal interface performance. For example, one material can be chosen for having a first property such as low shrinkage while another material can be chosen for a second property such as high thermal conductivity or optical properties such as Poly(methyl methacrylate) (PMMA) or other acrylics. By combining the two materials together using a spot cure, the resulting assembly may have unique strength or other thermal routing features.

As package and assembly size decreases on some products in the mobile and client spaces and thermal requirements continue to tighten, mechanically and thermally favorable interfaces may be able to serve in the role of stiffening structures and heat spreaders. This is particularly true with products featuring 2.5D stacked dies (stacked dies electrically connected through an intermediary) or 3D stacked dies (stacked dies directly electrically connected to each other. The multi-material design may be superior to single material interfaces in that it may enable anisotropic interfacial behaviors such as using materials of differing thermal conductivities to 'route' waste heat from a die stack interface around sensitive areas on a neighboring die.

In other embodiments, the integration of components into an assembly, when overall temperatures of the assembly arise, may result in different expansion or other distortions of the individual components. This may result in misalignment within the apparatus, for example of optical lenses and light paths, when the assembly heats up. By including various types of epoxies within the assembly that have known thermal expansion characteristics, known expansion or distortion characteristics of the epoxies may adjust for the expansion or distortion of components within the assembly over a dynamic and extended thermal range. This way, orientations of components or open spaces within the assembly may be maintained.

In the following detailed description, reference is made to the accompanying drawings which form a part hereof, wherein like numerals designate like parts throughout, and in which is shown by way of illustration, embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Various figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the figures, and sizes, thicknesses, or dimensions may be assumed for some embodiments only where specifically indicated or discussed.

Figure 1:
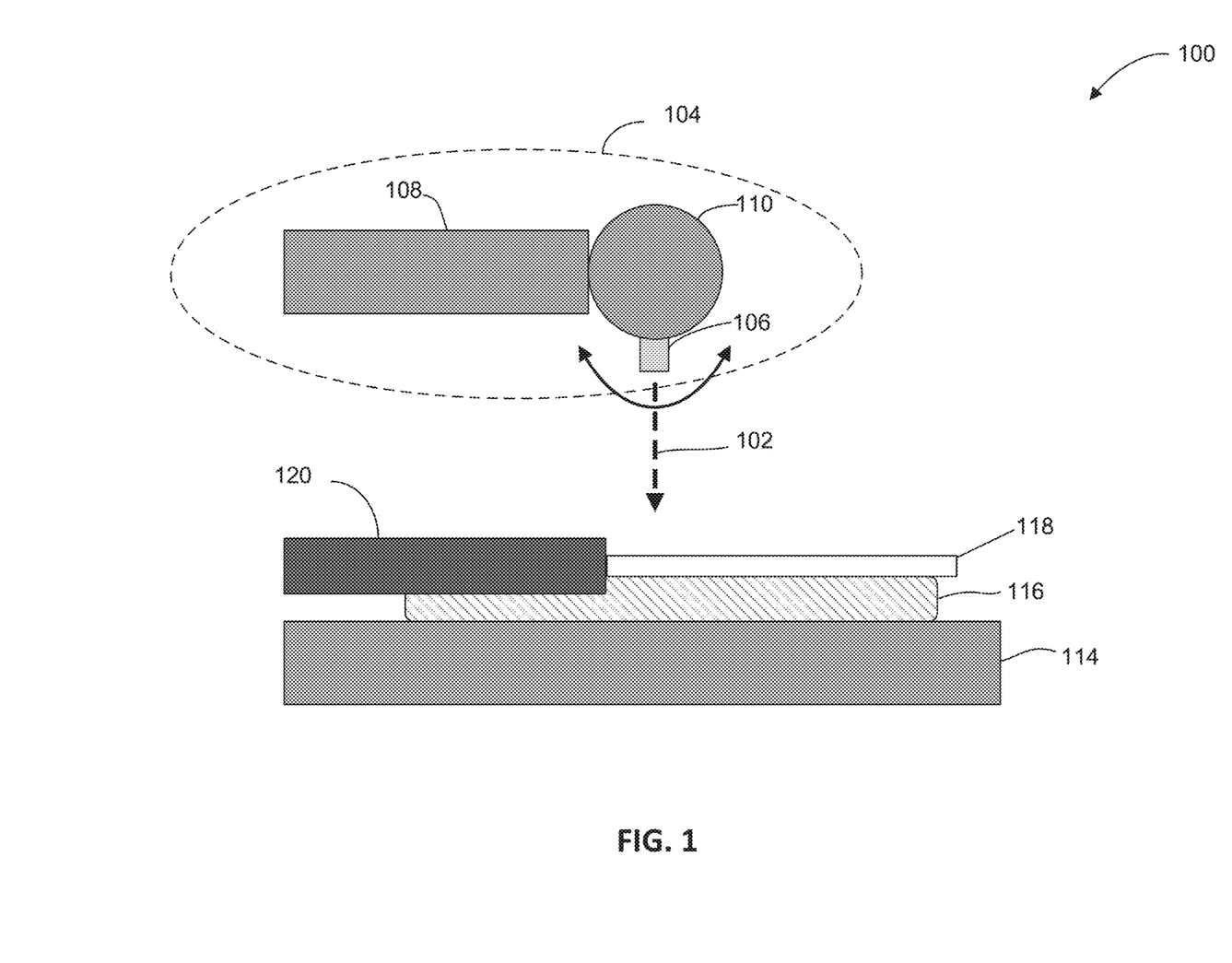
FIG. 1 illustrates an example configuration of a UV laser curing an epoxy on a substrate, in accordance with embodiments.

FIG. 1 illustrates an example configuration of a UV laser curing an epoxy on a substrate, in accordance with embodiments. FIG. 100 shows a UV laser beam 102 emanating from a laser beam source 104 that may include UV laser optics 106, a UV laser source 108, and a directional mechanism 110. The UV laser beam 102 may emanate from the UV laser optics 106. In embodiments, movements in the directional mechanism 110 may cause movements in the UV laser optics 106 that may result in the UV laser beam 102 movement.

A bottom component 114, which may be similar to a substrate or to some other component to which an epoxy may be applied, may be positioned substantially beneath UV laser optics 106. A layer of epoxy 116 that may be photo-initiated, may be applied to a portion of or to all of the bottom component 114. In embodiments, a top component 118 may be positioned between the UV laser optics 106 and/or the bottom component 114 or epoxy 116.

In embodiments, a handling tool 120 may be used to secure and/or to guide the top component 118, epoxy 116 and/or bottom component 114 during the curing process.

In embodiments, the bottom component 114, epoxy 116 and/or top component 118 may be moved relative to the position of the UV laser optics 106. The UV laser optics 106 may be moved using the directional mechanism 110 to cause the UV laser 102 to intersect the epoxy 116 at various locations and at various angles.

In embodiments, when the UV laser 102 intersects and interacts with the epoxy 116, heat generated by the interaction may cause the epoxy to cure. In embodiments, the epoxy 116 may have cationic properties. Cationic epoxy resins during curing with a UV laser beam 102 may generate a photo-induced decomposition of a photoinitiator, which may leave a positively charged fragment, called a "cation." Such electron-deficient or cationic intermediaries will chemically react rapidly with epoxide monomers and similar chemicals to produce a cationic polymerization. Curing characteristics may be varied by varying epoxy chemistry and thickness. In embodiments, a free-radical policy may be used, where the UV laser generates free radicals within the policy that speeds the polymerization reaction.

In embodiments, the laser beam source 104 may be able to vary attributes of the laser beam 102. For example, laser beam 102 frequency, power that may range from 100 milliwatt (mW) to 700 mW, raster rates that may range from 400 mm/s to 1000 mm/s. A width of the laser beam 102 may also be varied, as well as the direction of the laser with respect to the bottom component 114 and epoxy 116.

When a laser beam 102 encounters an epoxy 116, the epoxy in the path of the laser will heat up and quickly cure the encountered epoxy relative to legacy implementations. By varying the attributes of the laser beam, the structure of the cured epoxy may also be varied. For example, a high concentration of UV light may generate positively charged ions which speed the cure process by Palmer arising the epoxy. The heat of the UV light may then help cross-link the resulting polymer chains. In embodiments, the transition of the epoxy from an uncured state to a fully cured state may be less than one second.

In addition, this short time period to reach a full cure provides for less material shifting between the epoxy 116 and bottom component 114 and/or top component 118 during curing. During the curing process, as temperature of the epoxy 116 exposed to the laser beam 102 increases, the epoxy 116 viscosity will decrease until a point when the cure cross-linking dominates the thermal reduction in viscosity and the epoxy cures to its final state. Using a UV laser 102 to cure an epoxy 116 may decrease the time the epoxy 116 spends in decreased viscosity thus allowing substantially less time for components 118, 114 to shift relative to the epoxy 116 during curing.

In implementations, the laser beam source 104 may include multiple laser beam lenses 106 to implement multiple laser beams 102 that may be parallel with each other and at fixed distances between each other. As described below in FIG. 2, multiple laser beams 102 may be used to cure larger areas of epoxy.

Figure 2:
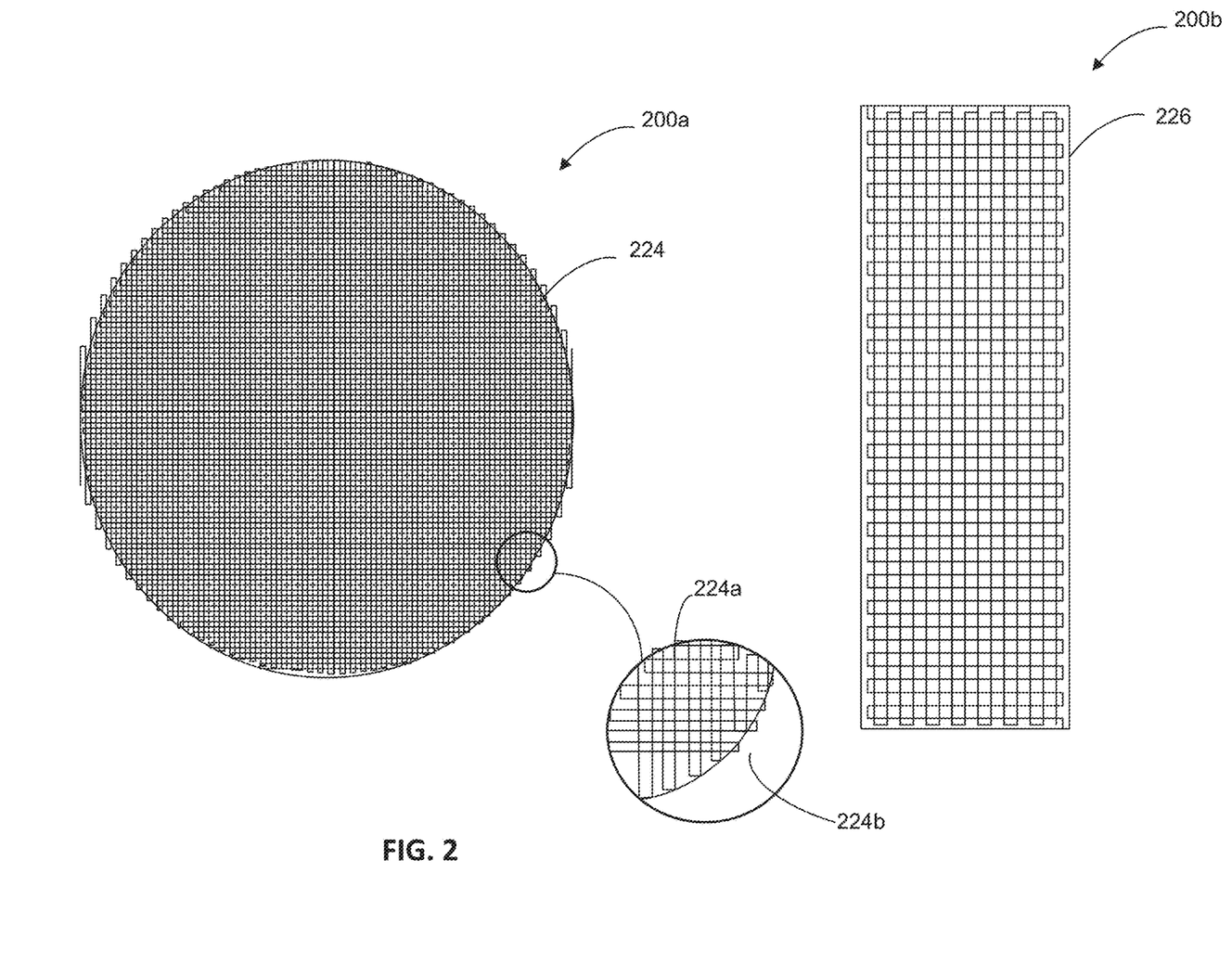
FIG. 2 illustrates examples of areas of cured epoxy, in accordance with embodiments.

FIG. 2 illustrates examples of areas of cured epoxy, in accordance with embodiments. Figure 200a shows a circular area 224 of epoxy cured by exposure to a laser beam such as laser beam 102 along two contiguous paths. In embodiments, circular area 224 may be 1 mm in diameter. The path of the laser beam 102 used to cure the epoxy such as epoxy 116 may be a cross hatched path. For example, the laser may travel in a first path 224a traversing the circular area 224, and then may travel in a second path 224b traversing the circular area 224. In embodiments, the first path 224a or the second path 224b may be made by multiple laser beams 102 from multiple laser beam lenses 106 that may traverse the circular area 224. The width of each path, determined for example by the diameter of the laser beam, may be sufficient to cure the epoxy between the center of each path 224a, 224b. In embodiments, the width of each path may be insufficient to cure the epoxy between the center of each path 224a, 224b. In one example, uncured epoxy (not shown) may exist within the circular area 224. This uncured epoxy may be flushed away and replaced with another material or may be left empty. Or, this uncured epoxy may be subsequently cured using legacy processes.

Figure 200b shows a rectangular area 226 of cured epoxy that may be cured in a manner similar to that described above for Figure 200a. In embodiments, the regions of cured epoxy shown in FIGS. 200a and 200b may be referred to as "spot cures." In embodiments, the UV laser lines 224a, 224b may be individual points representing a UV laser flash. In embodiments, the UV laser lines 224a, 224b may be curved or may be of any other shape.

Figure 3:
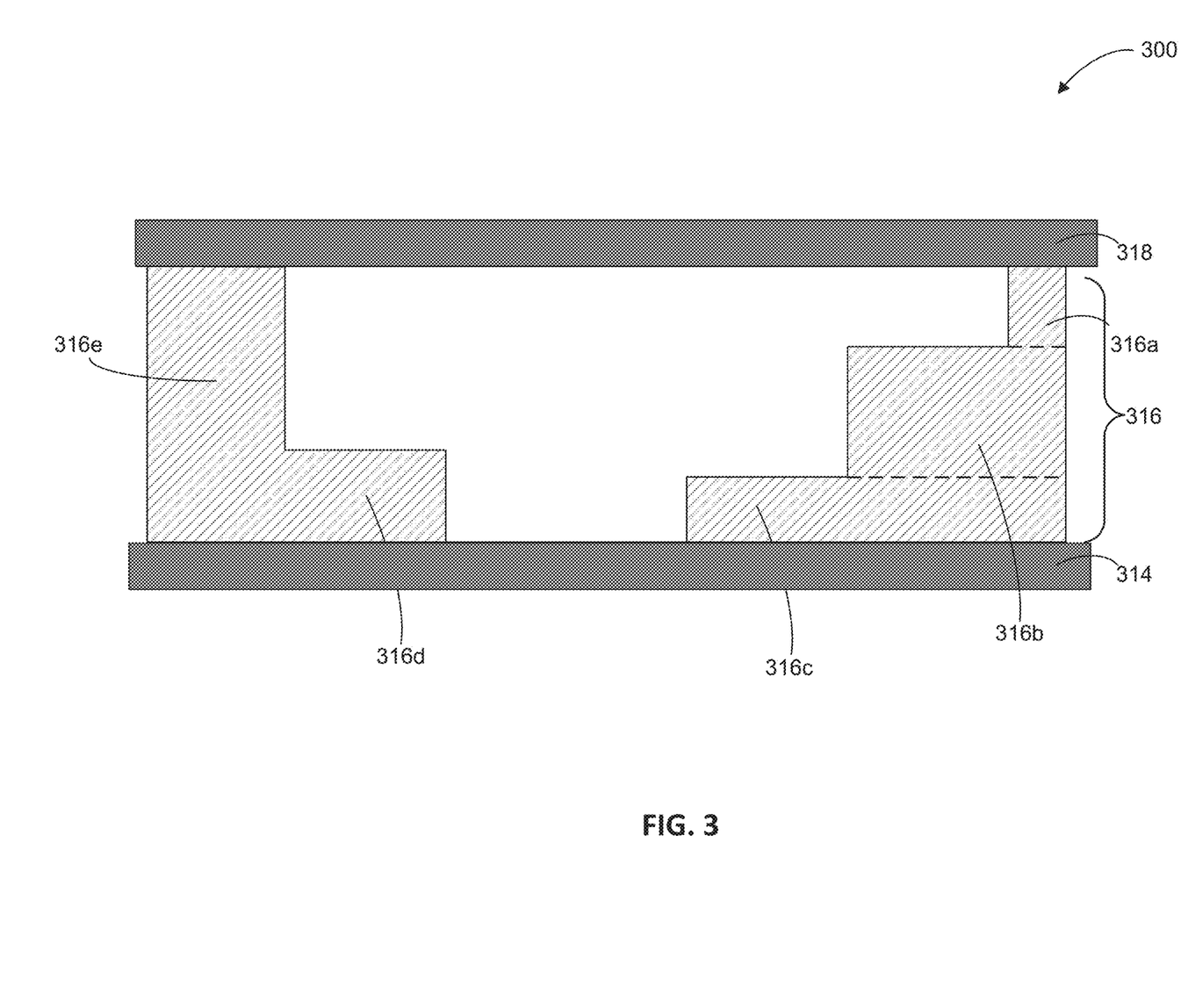
FIG. 3 illustrates an example of combining two material using UV laser epoxy curing, in accordance with embodiments.

FIG. 3 illustrates an example of combining two material using UV laser epoxy curing, in accordance with embodiments. FIG. 300 shows a component having a first component layer 318, and a second component layer 314, which may be similar to top component 118 and bottom component 114 of FIG. 1, that are secured together by cured epoxy 316, which may be similar to epoxy 116 of FIG. 1. The cured epoxy 316 may be cured using a UV laser beam 102 to create a spot cure to adhere the first component layer 318 to the second component layer 314.

In embodiments, the cured epoxy layers 316a-316e, that make up cured epoxy 316, may have been cured at different times. In embodiments, they may be made up of different epoxies. For example, cured epoxy layers 316c, 316d may have been applied to the second component layer 314 and the spot cure process as described above applied to cure the epoxy layers 316c, 316d. In embodiments, epoxy may have been placed only in the areas where the layers 316c, 316d are located on the second component layer 314 and the UV laser beam 102 applied. Or, epoxy may have been placed evenly on the surface of the second component layer 314, the UV laser beam 102 applied only to cure epoxy layers 316c and 316d, and the residual uncured epoxy subsequently washed away.

Similarly, cured epoxy layer 316b may be subsequently applied and will adhere to the lower epoxy layer 316c. For the cured epoxy layers 316a, 316e that are to be adhered to the first component layer 318, epoxy may be placed in the areas to be cured 316a, 316e, and the first component layer 318 placed on top of the uncured epoxy. The UV laser beam 102 may then be applied. In embodiments, the first component layer 318 may be selected such that the UV laser beam may pass through the layer substantially unimpeded and interact directly with the epoxy below to effect curing. As described above, any excess uncured epoxy may be washed away, leaving the structure of FIG. 300 as shown.

In embodiments, after any excess uncured epoxy is washed away, another type of epoxy may be injected into the empty cavity for subsequent curing using legacy curing techniques. In other embodiments, the empty cavities may be filled with coolant or other material with thermal conductivity properties so that heat may be transmitted or routed around the component of FIG. 300.

In embodiments, the first component layer 318 and the second component layer 314 may be substrates made of silicon, glass, or some other suitable material. In embodiments, the first component layer 318 and the second component layer 314 may be different components, for example various components that may make up a silicon photonics assembly, that may include optical components integrated into a final product package alongside one or more silicon dies.

For example, one material may be chosen for a property such as low shrinkage while another material may be chosen for its high thermal conductivity or its optical properties such as PMMA, acrylic, acrylic glass, or other acrylics. Additionally, the use of the localized cure process such as the spot cure described above may enable materials to be structured in a sequential cure, clean process, which may be similar to how positive lithography is performed.

Figure 4:
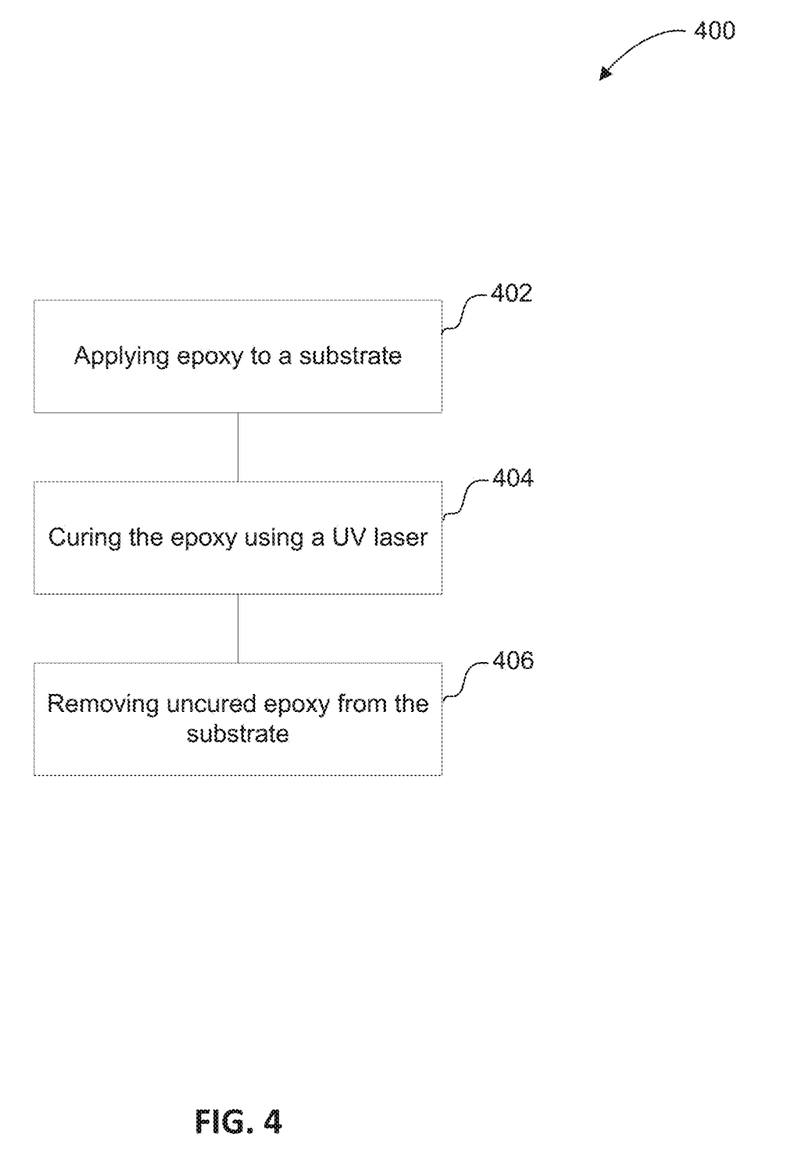
FIG. 4 is a block diagram that illustrates a process for UV laser epoxy curing, in accordance with various embodiments.

FIG. 4 is a block diagram that illustrates a process for UV laser epoxy curing, in accordance with various embodiments. In embodiments, the semiconductor device may comprise a package, or other semiconductor device such as a silicon photonics assembly including optical components. The semiconductor device may include substrates and other components that may be attached to each other by one or more epoxies that may be cured using a UV laser. The process 400 may comport with embodiments described in reference to FIGS. 1-3. The actions described in the process 400 may occur in a different order or in parallel; the order provided below is for purposes of illustration and does not limit this disclosure.

At block 402, the process may include applying epoxy to a substrate. The epoxy, such as epoxy 116 of FIG. 1, may be a photosensitive, photo-initiated, and/or UV-initiated cationic epoxy resin. The epoxy may be applied to an area of a substrate, such as substrate 114 of FIG. 1, to which the epoxy is to adhere to the substrate.

At block 404, the process may include curing the epoxy using a UV laser. In embodiments, the UV laser similar to or associate with laser beam source 104 that is to admit the UV laser beam that may be similar to UV laser beam 102 of FIG. 1. The composition or other characteristics of the epoxy may be chosen based upon the wavelength of UV laser or desired properties of the epoxy once it is cured. For example, a thermal expansion coefficient of the cured epoxy. In embodiments, the wavelength of the UV laser, as well as a diameter of the resulting UV laser beam may also be selected to affect the curing of the epoxy when it is exposed to the UV laser beam.

In addition, the angle of the laser beam may be varied so that it intersects with and interacts with the epoxy in a way that may not be perpendicular to the substrate. In embodiments, the UV laser may be pulsed, or turned on and off, and then moved through the epoxy to create pinpoints of cured epoxy. Or, the UV laser may remain on and may move in a line through the epoxy. By moving the UV laser in a pattern, larger shapes of cured epoxy, such as those shown in diagram 200*a* and 200*b* of FIG. 2, may be created. In embodiments, multiple lasers (e.g. 4 lasers) may be used in sequence to cure multiple spots or lines of epoxy to speed the spot curing process.

At block 406, the process may include removing uncured epoxy from the substrate. In embodiments, this may involve using solvents or other cleansing agents to flush the uncured epoxy from the surface of the substrate. This may allow a cured epoxy structure to exist on the surface of the substrate (an example of this where multiple structures may be built on a substrate may be found in diagram 300). For example, these multiple structures may allow for channels for a gas or other fluid to be inserted to allow for thermal conductivity along the substrate.

Figure 5:
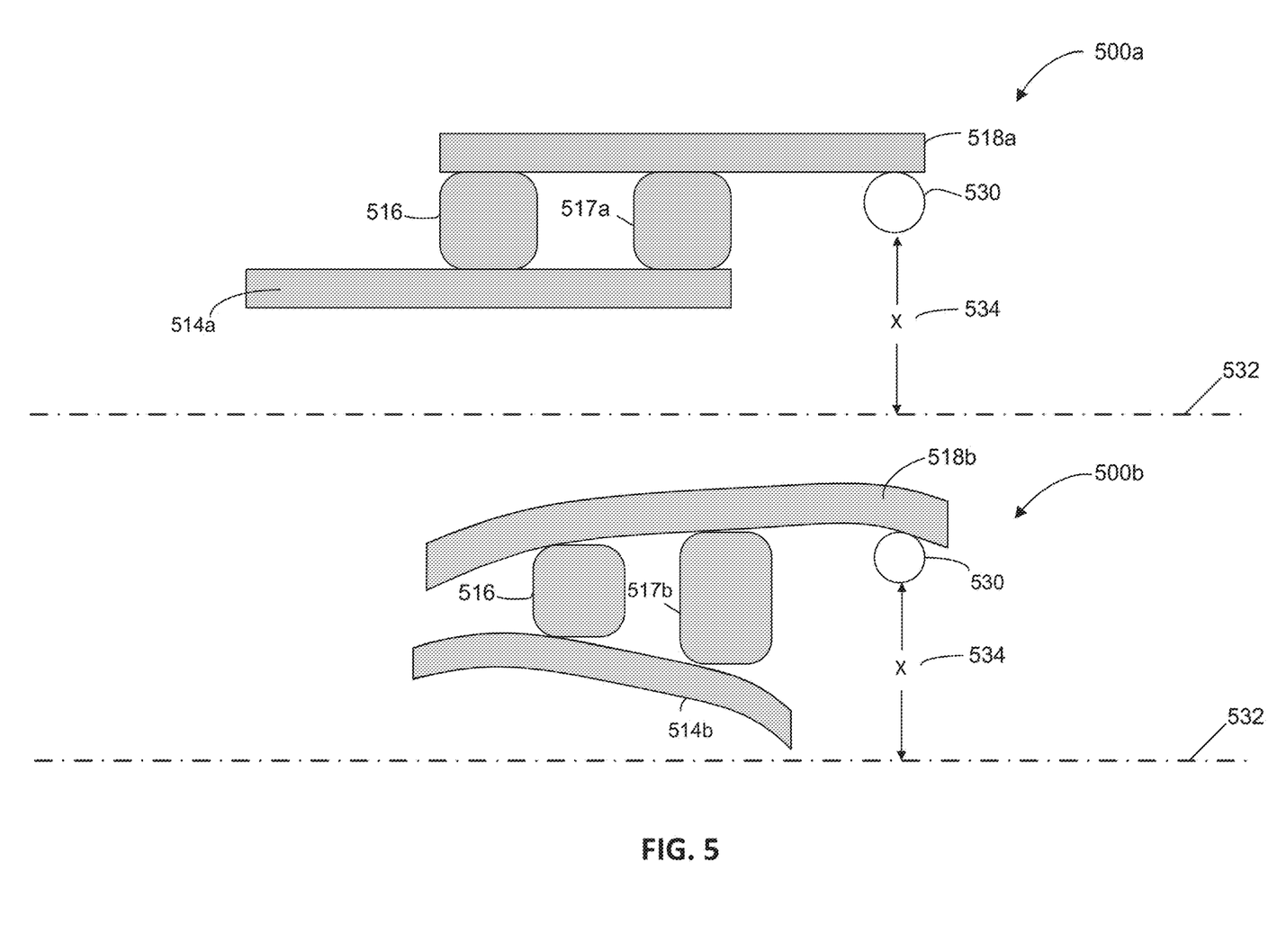
FIG. 5 illustrates an example of adhering components using UV laser curing to compensate for relative change of other components for stability across a dynamic thermal range, in accordance with embodiments.

FIG. 5 illustrates an example of adhering components using UV laser curing to compensate for relative change of other components for stability across a dynamic thermal range, in accordance with embodiments. In embodiments, the integration of components into an assembly, when overall temperatures of the assembly arise, may result in different expansion or other distortions of the individual components. By including various types of epoxies within the assembly that have known thermal expansion characteristics, orientations of components or of open spaces within the assembly may be maintained over a dynamic and extended thermal range.

The relative difference in change in volume of epoxies, which may include layers of epoxies, at a temperature, may compensate for the relative change of other components within the assembly to cause yet other components within an assembly to remain stable across a dynamic thermal range. This dynamic thermal range may be larger than the range found through a statically stable point at one temperature. Epoxy adhesives may be cured in a way that tightly controls the epoxy location, such as using a laser spot cure as described above, so non-uniformities over temperature differences do not induce unwanted component shift. In this way, an assembly design may purposefully control a source of variation within optical and photonic systems over a range of temperatures rather than simply seeking to minimize shifting overall of all components.

During operation, when the assembly or component is powered on, the resulting thermal profile may cause components and adhesives to shift where the shifting is partially or fully compensated and resulting assembly behavior, such as optical alignment and performance, may be maintained.

In embodiments, silicon photonics assemblies or other optical component integration assemblies may manage a thermal coefficient of expansion ($\alpha_{thermal}$) and mechanical tolerances within the assembly by attaching passive optical components such as a lens, filter or isolator directly to an active optical component. This approach, while generally decreasing the number of interfaces involved in the sub-assembly, may require that some components be cantilevered in free space to position them correctly within the optical path. This type of implementation may create a situation where thermally induced movement within the assembly may be magnified by the cantilever. This may cause optical signal losses unless this movement is either minimized or properly compensated.

In embodiments, multiple adhesives, which may be consecutive, with varying coefficients of thermal expansion, may be applied such that the expansion of the adhesives may compensate for temperature-dependent shifting in the component sub-assembly. Such implementations may enable a wider envelope of materials for assembly components by allowing the interfaces within or across assemblies to be designed such that epoxy shifting is intentional to maintain stability dynamically over a temperature range rather than statically at a single temperature.

For example, diagrams 500*a* and 500*b* may be a silicon photonics assembly that may include optical components to be integrated into a product package alongside a silicon die. In such an example, mechanical tolerances and tolerances of optical paths within the assembly are important. Other packages with other components having critical mechanical tolerances and/or pathways may exist in other embodiments. When the assembly heats up, included components, as well as epoxies or other adhesives within the assembly, may also heat up. This increase in heat may cause physical distortions such as flexing in some components. As a result, positioning of components or unobstructed pathways may experience movement past their tolerances and may cause the assembly to not perform properly.

Such distortions and flexing when the apparatus heats up may be compensated by using different types of epoxies having different expansion or other characteristics to connect the components. When the apparatus heats up, the different types of epoxies may cause adjustments within the apparatus so that tolerances, such as mechanical tolerances an optical path tolerances, are not exceeded. In embodiments, the different types of epoxies may be applied to various apparatus components and cured using one or more processes as described above.

Diagram 500*a* shows an assembly including components that are attached via one or more epoxies where the assembly is at a first temperature, for example at normal room temperature 25° C. Diagram 500*a* may show a bottom component 514*a* and the top component 518*a*, which may be similar to bottom component 114 and top component 118 respectively of FIG. 1 and may be coupled to each other using a first epoxy 516 and a second epoxy 517*a*. In this example, the bottom component 514*a* may be a substrate and top component 518*a* may be a substrate with lens 530 attached at a cantilevered end of the component. In this diagram, a first temperature may be a normal room temperature, at which a distance x 534 between the lens 530 and a reference line 532 is a fixed distance.

Diagram 500*b* shows an assembly where the components and epoxies that attach the components are at a second temperature, for example at 45° C. Diagram 500*b* may show a bottom component 514*b* and a top component 518*b* that have deformed due to the temperature and the properties of the respective components from their original shapes as shown in diagram 500*a*. The epoxy 517*b* has also deformed from the original epoxy 517*a*. Epoxy 517*a* may have a composition chosen for an ability to deform (expand) under higher temperatures to cause an increased separation between bottom component 514*b* and top component 518*b*. As a result, the position within the assembly between the lens 530 that is cantilevered may not change between diagram 500*a* and 500*b*. Also, the distance x between the lens 530 and an assembly reference line 532 may not change.

In embodiments, epoxy characteristics and epoxy layering/patterning may be chosen to maintain a position of a passive optical component relative to the optical path. In embodiments, patterning does not necessarily need to be two or more rows. Alternative shapes, such as an "L" shape may cause rotation of the epoxy layers in multiple directions depending on a thermal profile. These structures could be tuned in shape as needed on a per-design basis. This height change and rotation of the component relative to its lower surface can be modeled in a simplified situation where a thermally induced change in epoxy size may be modeled as $\Delta L_{epoxy} = (L_{initial})(\alpha_{thermal})(\Delta T)$. In embodiments, assuming a linear simplification for thermal expansion, the apparatus may shift in height to some degree, then a rotation may be induced due to the intentional mismatch in thermal expansion between the components.

As a result, embodiments may enable a wider temperature operating window or tighter alignment requirements within the current temperature range. Embodiments may enable a tighter alignment tolerance over a temperature range, which in turn may allow a more ambitious optical loss budget and improved signal transmission.

In embodiments, the various components, substrates, epoxies, and the like may have known movement characteristics based on one or more thermal profiles. For example, at one or more temperatures within a thermal range various movements may be expected. In embodiments, these movements may include expansion, contraction, deformation, warping, twisting, and the like. Given this known information, the assemblies may be assembled such that, in a non-limiting example, an optical path within or through the assemblies may maintain clear, and may have one or more components remain at or substantially at a certain distance with respect to the optical path. In embodiments, as the temperature of the assemblies varies over a thermal range, the known distortions may provide compensation for movements within the assembly to maintain the position of the optical path with respect to one or more components.

Figure 6:
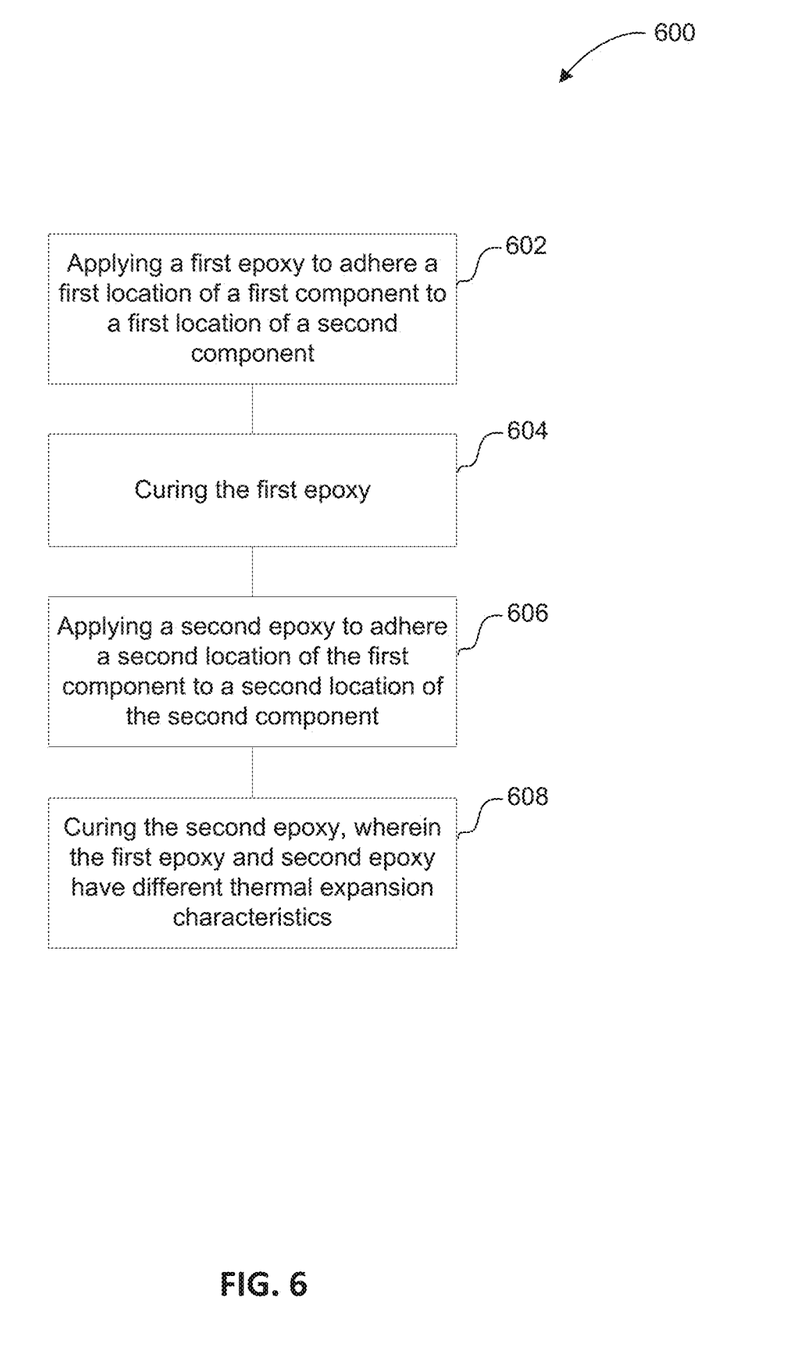
FIG. 6 is a block diagram that illustrates a process for adhering components using UV laser curing to compensate for relative change of other components for stability across a dynamic thermal range, in accordance with various embodiments.

FIG. 6 is a block diagram that illustrates a process for adhering components using UV laser curing to compensate for relative change of other components for stability across a dynamic thermal range, in accordance with various embodiments. In embodiments, the semiconductor device may comprise a package, or other semiconductor device such as a silicon photonics assembly including optical components. The semiconductor device may include substrates and other components that may be attached to each other by one or more epoxies that may be cured using a UV laser. The process 600 may comport with embodiments described in reference to FIG. 5. The actions described in the process 600 may occur in a different order or in parallel; the order provided below is for purposes of illustration and does not limit this disclosure.

At block 602, the process may include applying a first epoxy to adhere a first location of a first component to a first location of the second component. In embodiments, the first component may be top component 518a, the second component may be bottom component 514a, and the first epoxy 516 of FIG. 5. In embodiments, the first epoxy may be a photo-initiated epoxy resin as described above.

At block 604, the process may include curing the first epoxy. The first epoxy may be cured, and adhered to the first component and the second component using a UV laser process to spot cure the epoxy as described above. In embodiments, the first component or the second component may be of a substantially transparent material with respect to the UV laser and may cause the laser to penetrate and reach the epoxy for rapid curing. This process may cause the epoxy to be cured to the first component and to the second component.

In other embodiments, the epoxy such as epoxy 516 may be applied in a legacy manner and to be cured in a legacy manner using a thermal treatment over an extended period of time, for example from several minutes to an hour.

At block 606, the process may include applying a second epoxy to adhere a second location of the first component to a second location of the second component. In embodiments, the second epoxy may be similar to epoxy 517a of FIG. 5.

At block 608, the process may include curing the second epoxy, wherein the first epoxy and the second epoxy have different thermal expansion characteristics. For example the second epoxy may respond differently from the first epoxy as the overall temperature of the apparatus increases. The second epoxy may expand and/or twist in certain known directions. This may allow the second epoxy to compensate for thermal distortions in the first component and the second component, which may be represented by 518b and 514b. In embodiments, this may allow a third component, for example a lens 530 that may be attached to the first component 518a, 518b to remain at a substantially similar location with respect to the package across a wide thermal range as components may distort.

Figure 7:
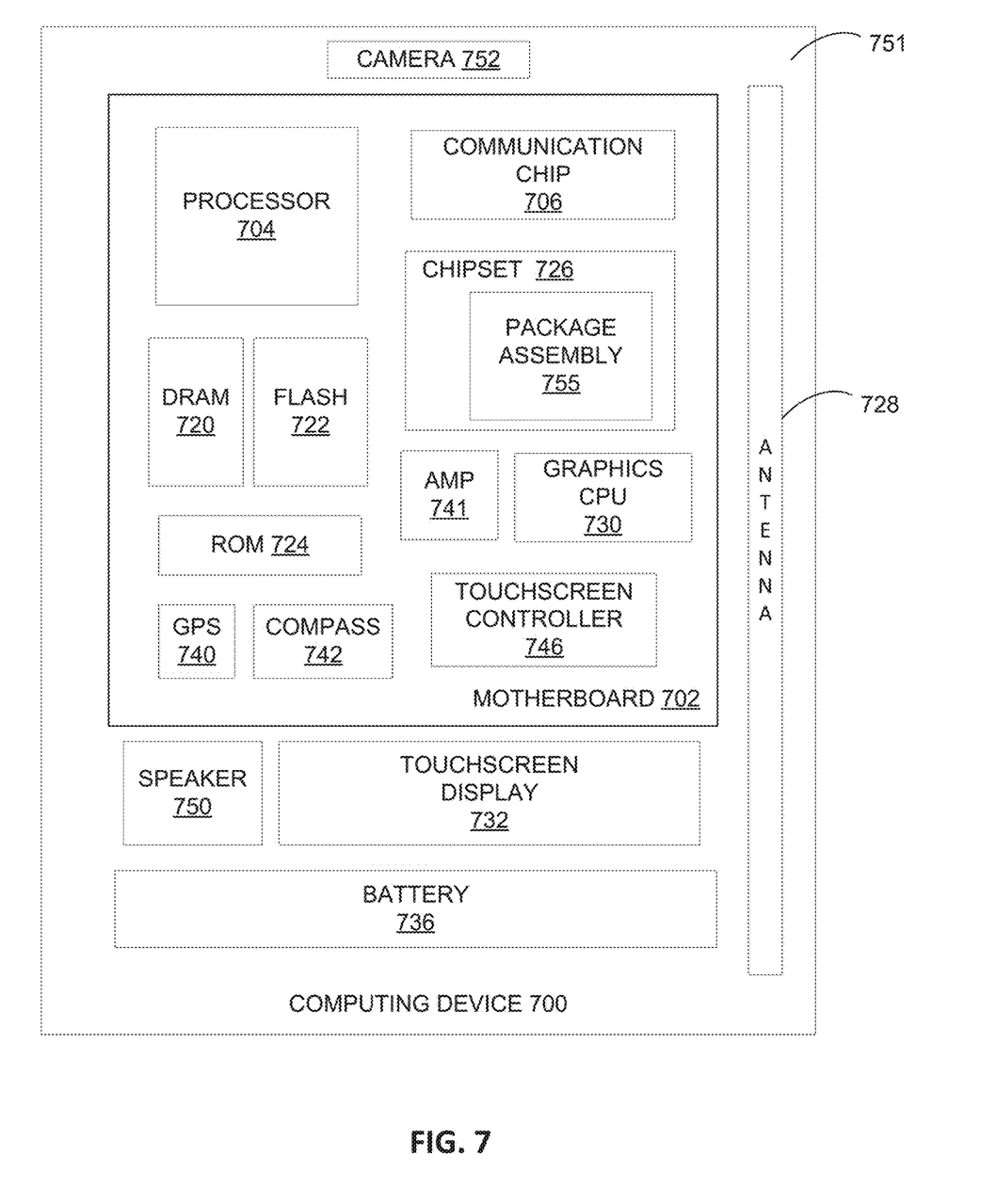
FIG. 7 schematically illustrates a computing device, in accordance with embodiments.

FIG. 7 schematically illustrates a computing device, in accordance with embodiments.

Embodiments of the present disclosure may be implemented into a system using any suitable hardware and/or software to configure as desired. FIG. 7 schematically illustrates a computing device 700 in accordance with one embodiment. The computing device 700 may house a board such as motherboard 702 (i.e., housing 751). The motherboard 702 may include a number of components, including but not limited to a processor 704 and at least one communication chip 706. The processor 704 may be physically and electrically coupled to the motherboard 702. In some implementations, the at least one communication chip 706 may also be physically and electrically coupled to the motherboard 702. In further implementations, the communication chip 706 may be part of the processor 704.

Depending on its applications, computing device 700 may include other components that may or may not be physically and electrically coupled to the motherboard 702. These other components may include, but are not limited to, volatile memory (e.g., DRAM) 720, non-volatile memory (e.g., ROM) 724, flash memory 722, a graphics processor 730, a digital signal processor (not shown), a crypto processor (not shown), a chipset 726, an antenna 728, a display (not shown), a touchscreen display 732, a touchscreen controller 746, a battery 736, an audio codec (not shown), a video codec (not shown), a power amplifier 741, a global positioning system (GPS) device 740, a compass 742, an accelerometer (not shown), a gyroscope (not shown), a speaker 750, a camera 752, and a mass storage device (such as hard disk drive, compact disk (CD), digital versatile disk (DVD), and so forth) (not shown). Further components, not shown in FIG. 7, may include a microphone, a filter, an oscillator, a pressure sensor, RFID chip, optical components and/or photonics assemblies. In embodiments, one or more of the package assembly components 755 may be a package assembly such as the package assemblies of FIG. 3 or 5.

The communication chip 706 may enable wireless communications for the transfer of data to and from the computing device 700. The term "wireless" and its derivatives may be used to describe circuits, devices, systems, processes, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible broadband wireless access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 706 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 406 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 406 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 706 may operate in accordance with other wireless protocols in other embodiments.

The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, EV-DO, and others.

The processor 704 of the computing device 700 may include a die in a package assembly such as, for example, one of the package assemblies of FIG. 3 or 5 described herein. The term "processor" may refer to any device or portion of a device that processes electronic data from registers and/or memory to transform that electronic data into other electronic data that may be stored in registers and/or memory.

In various implementations, the computing device 400 may be a laptop, a netbook, a notebook, an Ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 400 may be any other electronic device that processes data, for example, an all-in-one device such as an all-in-one fax or printing device.

EXAMPLES

Example 1 may be an apparatus, comprising: a substrate with a surface; a volume of epoxy coupled to an area of the surface, wherein the volume of epoxy is cured and surrounded by material other than cured epoxy, and wherein the area of the surface is substantially equal to a width of an ultraviolet (UV) laser beam that was used to cure the epoxy.

Example 2 may include the apparatus of example 1, wherein the width of the UV laser beam is the diameter of the UV laser beam.

Example 3 may include the apparatus of example 1, wherein the substrate is a first substrate and the surface is a first surface; and wherein the apparatus further includes a second substrate with a second surface that faces the first surface, wherein the volume of epoxy is coupled to the first surface and the second surface to fixedly couple the first substrate and the second substrate.

Example 4 may include the apparatus of example 3, wherein the first substrate is a first material with a first set of properties and the second substrate is a second material with a second set of properties; and wherein the coupled first material and second material form a combined material with at least some of the first set of properties and at least some of the second set of properties.

Example 5 may include the apparatus of example 3, wherein the first substrate has a known movement based on a first thermal profile within a thermal range, the second substrate has a known movement based on a second thermal profile within the thermal range, and the cured epoxy has a known movement based on a third thermal profile within the thermal range; and further including a component coupled to the first substrate, wherein the location, composition, dimensions and/or curing profile of the epoxy is to create a known movement of the epoxy within a thermal range; and wherein the epoxy is to move to compensate for movements in the first substrate and the second substrate to cause the location of the component to be substantially fixed relative to the apparatus over the thermal range.

Example 6 may include the apparatus of example 5, wherein the component is a lens.

Example 7 may include the apparatus of example 1, wherein the volume of epoxy is a first volume of epoxy and the area of the surface is a first area of the surface; and further including a second volume of epoxy coupled to a second area of the surface.

Example 8 may include the apparatus of example 7, wherein the first volume of epoxy and the second volume of epoxy are in direct physical contact.

Example 9 may include the apparatus of any one of examples 1-8, wherein the epoxy is a photosensitive epoxy resin or a UV initiated cationic epoxy resin.

Example 10 may be a method, comprising: applying epoxy to a surface of a substrate; exposing an area of the epoxy applied to the surface to a ultraviolet (UV) laser to cure the area of the epoxy; and wherein the cured area of the epoxy is to fixedly couple the epoxy to the surface.

Example 11 may include the method of example 10, wherein to cure the area of the epoxy further includes to cure an area of the epoxy that is substantially a width of the UV beam used to cure the epoxy.

Example 12 may include the method of example 10, wherein the substrate is a first substrate and the surface is a first surface; and further including applying the epoxy to a second surface of a second substrate; and wherein the cured area of the epoxy is to fixedly couple the epoxy to the first surface and the second surface.

Example 13 may include the method of example 12, further comprising removing at least a portion of uncured epoxy between the first surface of the first substrate and the second surface of the second substrate.

Example 14 may include the method of example 13, wherein the epoxy is a first epoxy; and further comprising applying a second epoxy to fill an area between the first substrate and the second substrate, wherein the first epoxy is to hold the first substrate and the second substrate in a fixed position during curing of the second epoxy.

Example 15 may include the method of example 14, wherein the area of the first epoxy further includes multiple areas of the first epoxy.

Example 16 may include the method of example 15, wherein the first epoxy and the second epoxy are to thermally conduct heat from a first area of the apparatus to a second area of the apparatus.

Example 17 may include the method of example 10, wherein to cure the area of the epoxy is to cure the area of the epoxy in less than 0.2 seconds.

Example 18 may be a system, comprising: a first component; a second component coupled with the first component, the second component including: a substrate with a surface; a volume of epoxy coupled to an area of the surface, wherein the volume of epoxy is cured and surrounded by material other than cured epoxy, and wherein the area of the surface is substantially equal to a width of an ultraviolet (UV) laser beam that was used to cure the epoxy.

Example 19 may include the system of example 18, wherein the width of the UV laser beam is the diameter of the UV laser beam.

Example 20 may include the apparatus of example 18, wherein the substrate is a first substrate and the surface is a first surface; and wherein the second component further includes a second substrate with a second surface that faces the first surface, wherein the volume of epoxy is coupled to the first surface and the second surface to fixedly couple the first substrate and the second substrate.

Example 21 may include the system of example 20, wherein the first substrate is a first material with a first set of properties and the second substrate is a second material with a second set of properties; and wherein the coupled first material and second material form a combined material with at least some of the first set of properties and at least some of the second set of properties.

Example 22 may include the system of example 20, wherein the first substrate has a known movement based on a first thermal profile within a thermal range, the second substrate has a known movement based on a second thermal profile within the thermal range, and the cured epoxy has a known movement based on a third thermal profile within the thermal range; and further including a component coupled to the first substrate, wherein the location, composition, dimensions and/or curing profile of the epoxy is to create a known movement of the epoxy within a thermal range; and wherein the epoxy is to move to compensate for movements in the first substrate and the second substrate to cause the location of the component to be substantially fixed relative to the apparatus over the thermal range.

Example 23 may include the system of example 22, wherein the component is a lens.

Example 24 may include the system of example 18, wherein the volume of epoxy is a first volume of epoxy and the area of the surface is a first area of the surface; and further including a second volume of epoxy coupled to a second area of the surface.

Example 25 may include the system of example 24, wherein the first volume of epoxy and the second volume of epoxy are in direct physical contact.

Example 26 may include the system of any one of examples 18-25, wherein the epoxy is a photosensitive epoxy resin or a UV initiated cationic epoxy resin.

Example 27 may be an apparatus, comprising: means for applying epoxy to a surface of a substrate; means for exposing an area of the epoxy applied to the surface to a ultraviolet (UV) laser to cure the area of the epoxy; and wherein the cured area of the epoxy is to fixedly couple the epoxy to the surface.

Example 28 may include the apparatus of example 27, wherein to cure the area of the epoxy further includes to cure an area of the epoxy that is substantially a width of the UV beam used to cure the epoxy.

Example 29 may include the apparatus of example 27, wherein the substrate is a first substrate and the surface is a first surface; and further including means for applying the epoxy to a second surface of a second substrate; and wherein the cured area of the epoxy is to fixedly couple the epoxy to the first surface and the second surface.

Example 30 may include the apparatus of example 29, further comprising means for removing at least a portion of uncured epoxy between the first surface of the first substrate and the second surface of the second substrate.

Example 31 may include the apparatus of example 30, wherein the epoxy is a first epoxy; and further comprising means for applying a second epoxy to fill an area between the first substrate and the second substrate, wherein the first epoxy is to hold the first substrate and the second substrate in a fixed position during curing of the second epoxy.

Example 32 may include the apparatus of example 31, wherein the area of the first epoxy further includes multiple areas of the first epoxy.

Example 33 may include the apparatus of example 32, wherein the first epoxy and the second epoxy are to thermally conduct heat from a first area of the apparatus to a second area of the apparatus.

Example 34 may include the apparatus of example 27, wherein to cure the area of the epoxy is to cure the area of the epoxy in less than 0.2 seconds.

Example 35 may include an apparatus comprising: a substrate with a known movement based on a thermal profile within a thermal range; a first component coupled to the substrate, wherein the first component is at a distance from an optical path; a volume of cured epoxy coupled to the substrate and coupled to a second component, wherein the volume of epoxy has a known movement based on a thermal profile within the thermal range; and wherein movements of the substrate and of the cured epoxy over temperature variations within the thermal range compensate so that the distance between the first component and the optical path remains substantially the same.

Example 36 may include the apparatus of example 35, wherein the cured epoxy is cured with an ultraviolet (UV) laser.

Example 37 may include the apparatus of example 35, wherein the volume of cured epoxy is a first volume of cured epoxy; and further comprising: a second volume of cured epoxy coupled to the substrate and to the second component, wherein the second volume of cured epoxy has a known movement based on a thermal profile within the thermal range; and wherein movements of the substrate, of the first cured epoxy, and of the second cured epoxy over temperature variations within the thermal range compensate so that the distance between the first component and the optical path remains substantially the same.

Example 38 may include the apparatus of any one of examples 35-37, wherein the first component is a lens.

Example 39 may include the apparatus of any one of examples 35-37, wherein the apparatus is a photonics assembly.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

What is claimed is:

1. An apparatus, comprising:
   a first substrate with a surface, wherein the first substrate has a known movement based on a first thermal profile within a thermal range;
   a second substrate with a surface that faces the first substrate surface, wherein the second substrate has a known movement based on a second thermal profile within the thermal range; a volume of epoxy coupled to an area of the first substrate surface and the second substrate surface to fixedly couple the first substrate and the second substrate, wherein the volume of epoxy is cured and surrounded by material other than cured epoxy, and wherein the cured epoxy has a known movement based on a third thermal profile within the thermal range;
   a component coupled to the first substrate, wherein a location, composition, dimensions and/or curing profile of the epoxy is to create a known movement of the epoxy within the thermal range; and
   wherein the epoxy is to move to compensate for movements in the first substrate and the second substrate to cause the location of the component to be fixed relative to the apparatus over the thermal range.

2. The apparatus of claim 1, wherein the area of the first substrate surface and the second substrate surface are a width of a UV laser.

3. The apparatus of claim 1, wherein the component is a lens.

4. The apparatus of claim 1, wherein the volume of epoxy is a first volume of epoxy and the area of the first substrate surface is a first area of the first substrate surface; and
   further including a second volume of epoxy that is cured and is coupled to a second area of the first substrate surface.

5. The apparatus of claim 4, wherein the first volume of epoxy and the second volume of epoxy are in direct physical contact.

6. The apparatus of claim 1, wherein the epoxy is a photosensitive epoxy resin or a UV initiated cationic epoxy resin.

7. A method, comprising:
   applying epoxy to a surface of a first substrate and a surface of a second substrate;
   exposing an area of the epoxy applied to the surface of the first substrate and the surface of the second substrate to an ultraviolet (UV) laser beam to cure the area of the epoxy;
   wherein the cured area of the epoxy is to fixedly couple the epoxy to the surface of the first substrate and the surface of the second substrate; and
   removing at least a portion of uncured epoxy between the surface of the first substrate and the surface of the second substrate.

8. The method of claim 7, wherein to cure the area of the epoxy further includes to cure an area of the epoxy that is a width of the UV laser beam used to cure the epoxy.

9. A system, comprising:
   a first component;
   an apparatus coupled with the first component, the apparatus including:
      a first substrate with a surface, wherein the first substrate has a known movement based on a first thermal profile within a thermal range;
      a second substrate with a surface that faces the surface of the first substrate, wherein the second substrate has a known movement based on a second thermal profile within the thermal range;
      a volume of epoxy coupled to an area of the surface of the first substrate, wherein the volume of epoxy is cured and surrounded by material other than cured epoxy, wherein the cured epoxy has a known movement based on a third thermal profile within the thermal range, and wherein the area of the surface is approximately a width of an ultraviolet (UV) laser beam that was used to cure the epoxy; and
      a second component coupled to the first substrate, wherein a location, composition, dimensions and/or curing profile of the epoxy is to create a known movement of the epoxy within a thermal range.

10. The system of claim 9, wherein the width of the UV laser beam is a diameter of the UV laser beam.

11. The system of claim 9, wherein the substrate is a first substrate and the surface is a first surface; and
    wherein the apparatus further includes a second substrate with a second surface that faces the first surface, wherein the volume of epoxy is coupled to the first surface and the second surface to fixedly couple the first substrate and the second substrate.

12. The system of claim 11, wherein the third component is a lens.

13. An apparatus, comprising:
    means for applying epoxy to a surface of a first substrate;
    means for applying the epoxy to a surface of a second substrate;
    means for exposing an area of the epoxy applied to the surface to an ultraviolet (UV) laser beam to cure the area of the epoxy; and
    wherein the cured area of the epoxy is to fixedly couple the epoxy to the surface of the first substrate and the surface of the second substrate.

14. The apparatus of claim 13, wherein to cure the area of the epoxy further includes to cure an area of the epoxy that is approximately a width of the UV laser beam used to cure the epoxy.

15. The apparatus of claim 13, further comprising means for removing at least a portion of uncured epoxy between the first surface of the first substrate and the second surface of the second substrate.

16. The apparatus of claim 15, wherein the epoxy is a first epoxy; and further comprising means for applying a second epoxy to fill an area between the first substrate and the second substrate, wherein the first epoxy is to hold the first substrate and the second substrate in a fixed position during curing of the second epoxy.

17. The apparatus of claim 16, wherein the area of the first epoxy further includes multiple areas of the first epoxy.

18. An apparatus comprising:

a substrate with a known movement based on a thermal profile within a thermal range;

a first component coupled to the substrate, wherein the first component is at a distance from an optical path;

a volume of cured epoxy coupled to the substrate and coupled to a second component, wherein the volume of epoxy has a known movement based on a thermal profile within the thermal range; and wherein movements of the substrate and of the cured epoxy over temperature variations within the thermal range compensate so that the distance between the first component and the optical path is maintained.

19. The apparatus of claim 18, wherein the cured epoxy is cured with an ultraviolet (UV) laser.

20. The apparatus of claim 18, wherein the volume of cured epoxy is a first volume of cured epoxy; and further comprising:

a second volume of cured epoxy coupled to the substrate and to the second component, wherein the second volume of cured epoxy has a known movement based on a thermal profile within the thermal range; and wherein movements of the substrate, of the first cured epoxy, and of the second cured epoxy over temperature variations within the thermal range compensate so that the distance between the first component and the optical path remains substantially the same.

21. The apparatus of claim 18, wherein the first component is a lens.

22. The apparatus of claim 18, wherein the apparatus is a photonics assembly.

\* \* \* \* \*